July 31 1951     J. ROBINSON     2,562,367

HYDRAULIC POWER TRANSMISSION SYSTEM

Filed Nov. 15, 1945

INVENTOR.
JAMES ROBINSON

BY

*Ralph L. Tweedale*

ATTORNEY

Patented July 31, 1951

2,562,367

UNITED STATES PATENT OFFICE 2,562,367

HYDRAULIC POWER TRANSMISSION SYSTEM

James Robinson, Huntington Woods, Mich., assignor to Vickers Incorporated, Detroit, Mich., a corporation of Michigan Application November 15, 1945, Serial No. 628,685

9 Claims. (Cl. 60—53)

This invention relates to power transmissions, particularly to those of the type comprising two or more fluid pressure energy translating devices, one of which may function as a pump and another as a fluid motor.

The invention is more particularly concerned with a power transmission system particularly adapted for driving a load device requiring substantially constant speed drive from a prime mover which operates at varying speed. For example, in a refrigerated motor vehicle the refrigerator compressor is most efficient when operated at a substantially constant speed and control of refrigeration output is obtained by stopping the compressor automatically when the refrigerated compartment has been reduced to the proper temperature, or when the suction pressure at the compressor has been reduced to the proper degree. The vehicle engine, however, is not operated at constant speed but its speed varies widely under different road conditions.

It is an object, of the present invention to provide an improved hydraulic power transmission and control system particularly adapted for vehicle refrigerator drives which will maintain a substantially constant output speed when driven at any input speed over a wide range.

It is a further object of the invention to provide a power transmission system having a variable displacement pump including a displacement regulating fluid motor which is normally effective to maintain a constant speed at the transmission output and which may be also utilized for stopping the transmission effectively and reliably without complicated additional control mechanism.

Further objects and advantages of the present invention will be apparent from the following description, reference being had to the accompanying drawing wherein a preferred form of the present invention is clearly shown.

Figure 1:
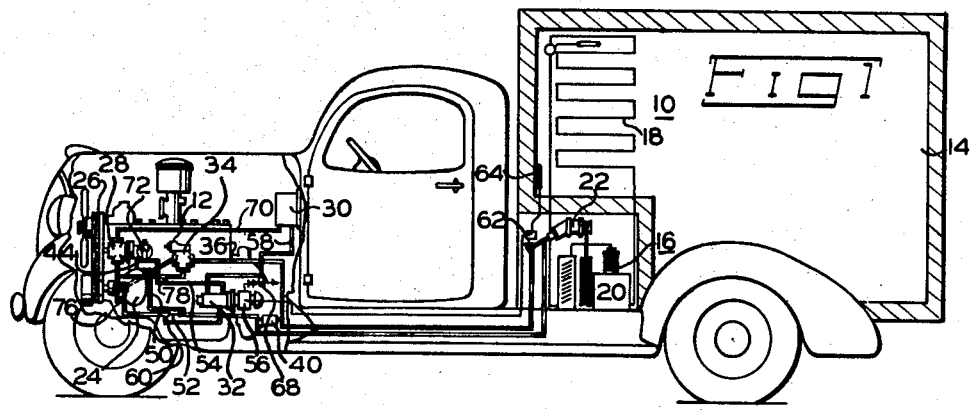
Figure 1 is a side view of a refrigerator vehicle partly broken away showing a preferred form of the present invention.

Referring now to Figure 1, there is shown a truck 10 having an engine 12 and a refrigerated compartment 14. A condensing unit 16, of conventional form, may be provided for refrigerating the compartment 14 by means of the usual evaporator 18. The condensing unit 16 has a compressor 20 which is belt driven by means of a rotary fluid motor 22. Fluid for driving the motor 22 is supplied by a variable displacement pump 24 mounted on and driven from the engine 12; as, for example, by means of a fan belt 26. A small fixed displacement replenishing pump 28 is also driven from the engine 12 for the purpose of replenishing leakage from the hydraulic system and maintaining a low positive pressure on the inlet of the pump 24. Also mounted adjacent to the engine 12 are a reservoir 30 and suitable control valves 32 and 34, lated to be described.

Figure 2:
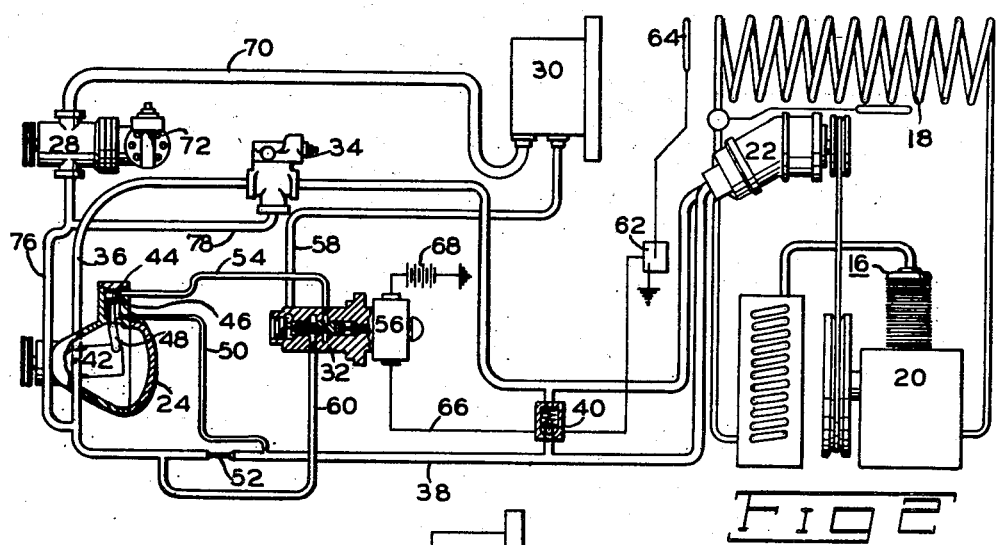
Figure 2 is a diagrammatic view of the hydraulic power transmission system and refrigerating circuit showing the parts in the positions occupied when the refrigerator compressor is at rest.
Figure 3:
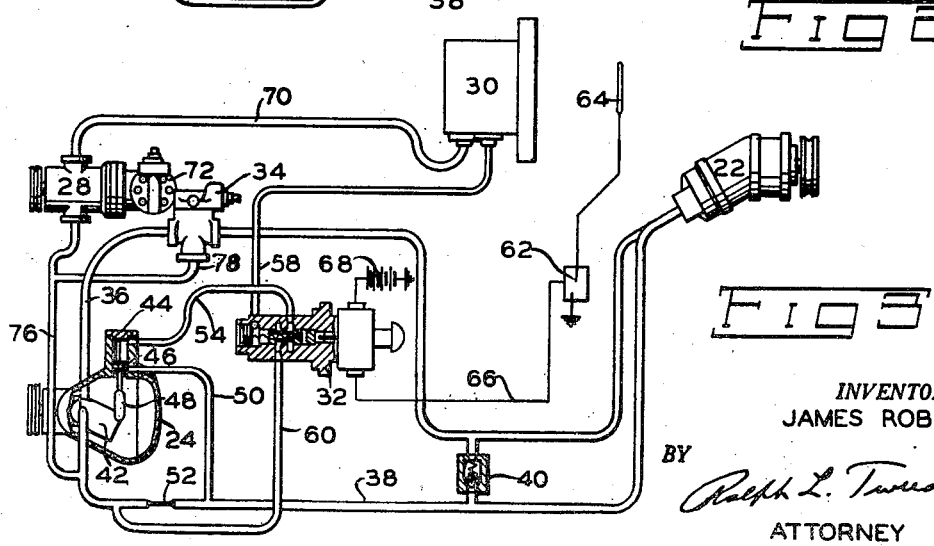
Figure 3 is a diagrammatic view of the hydraulic power transmission system showing the parts in the position occupied when the compressor is being operated and the vehicle engine is moving at minimum speed.

Referring now to Figure 2, the pump 24 has its discharge port located underneath the same and connected by a conduit 36 to the inlet port of the motor 22. The outlet port of motor 22 is connected by conduit 38 to the inlet port of pump 24 thus placing the pump and motor in a closed circuit. This circuit is shunted by a check valve 40 open to free flow from conduit 38 to conduit 36. The pump 24 is of the reversible variable displacement type and has a yoke 42 pivotally mounted therein to vary the displacement and direction of flow of the fluid passing thru the pump. In the position shown in Figure 2, the yoke is slightly above horizontal position and in this position the displacement of pump 24 is of a very small value in the reverse direction, that is, delivery takes place from conduit 36 into conduit 38 and check valve 40 effectively by-passes this delivery back to the pump inlet. When the yoke 42 is moved downwardly below horizontal position the pump delivery is from conduit 38 into conduit 36 and in an amount depending upon the amount of downward movement of yoke 42. In Figure 3, the yoke 42 is shown in its maximum forward displacement position.

For the purpose of controlling the position of yoke 42 a small fluid motor, comprising a cylinder 44 and a piston 46, are mounted on the housing of the pump 24, the piston 46 being connected to the yoke 42 by a link 48. The lower end of cylinder 44 is connected to conduit 38 by a branch conduit 50 which enters the conduit 38 near the right hand end of a restrictor 52 in the conduit 38. The upper end of cylinder 44 is connected by a conduit 54 to one port of the three-way valve 32.

Valve 32 is operated by a solenoid 56 which, when energized as shown in Figure 2, connects the conduit 54 to a tank conduit 58 leading to the reservoir 30. When the solenoid 56 is de-energized the valve 32 connects conduit 54 to a conduit 60 which connects with conduit 38 at a point to the left of the restrictor 52. Solenoid 56 is adapted to be controlled in response to refrigeration demand; for example, a thermostatic switch 62 has its temperature responsive bulb 64 located in the refrigerated space 14, and when the temperature therein reaches a predetermined low point switch 62 closes to energize solenoid 56 thru the circuit 66 which includes the vehicle battery 68.

The replenishing pump 28 has a suction conduit 70 connected with a reservoir 30 and has a self-contained relief valve 72. The delivery line 76 from pump 28 connects to conduit 38 at a point adjacent to the inlet of pump 24. A suitable overload relief valve 34 is mounted in the conduit 36 and has its overflow conduit 78 connected to the conduit 76.

In operation with the parts in the position shown in Figure 2, thermostatic switch 62 has energized the solenoid 56 which shifts valve 32 to connect conduit 54 with conduit 58. This connects the upper end of cylinder 44 to tank. Pump 28 being continuously driven maintains a low pressure in conduit 38 which is transmitted thru conduit 58 to the lower end of cylinder 44 pushing piston 46 upwardly to the limit of its stroke thereby shifting yoke 42 to the position of small reverse displacement. The continued operation of pump 24 therefore delivers oil at a slow rate from conduit 36 to conduit 38 and thru check valve 40 back to conduit 36. The pressure drop thru check valve 40 is insignificant and consequently the entire circuit is maintained under the low pressure determined by relief valve 72 of pump 28. Fluid motor 22 having substantially equal pressure on its opposite sides therefore is inoperative, regardless of the speed of the engine 12.

When the temperature within compartment 14 rises to a predetermined value thermostatic switch 62 will open de-energizing solenoid 56 permitting valve 32 to shift under the urge of its internal spring and connect conduit 54 with conduit 60. Since there is only an insignificant flow thru the restrictor 52 there is substantially no pressure drop therethru and momentarily the pressures in conduits 50 and 60 are substantially equal. Since the area of the upper face of piston 46 is greater than the lower face the piston will be urged downwardly shifting the yoke 42 toward the position of maximum forward displacement. Depending upon the speed of engine 12 the yoke will come to a position producing a predetermined volumetric rate of delivery. This is determined by the size of the restrictor 52 which when oil is passing therethru in a predetermined volume will create a pressure drop from the conduit 50 to the conduit 60 such that equal forces will be exerted on the top and bottom faces of piston 46. When this point is reached the piston 46 comes to a standstill holding the yoke 42 in this position.

Should the engine speed increase that will tend to increase the rate of flow thru the pump 24 and consequently thru restrictor 52 thereby increasing the pressure drop thru restrictor 52. This tends to increase pressure in conduit 50 relative to that in conduit 60 thus creating a greater force on the bottom surface of piston 46 and moving yoke 42 upwardly until the pump delivery has been restored to the predetermined value. Conversely should the speed of engine 12 tend to decrease then the pressure drop thru restrictor 52 will tend to decrease thereby creating a greater force on the upper surface of the piston 44 moving yoke 42 downwardly until the pump delivery has been brought up again to its predetermined value. The restrictor 52 thus constitutes a means for measuring the velocity of fluid flow in the main power circuit and is typical of various devices such as a venturi which may be used for this purpose. In this way the speed of the fixed displacement fluid motor 22 is maintained constant so long as the solenoid 56 remains de-energized.

It will thus be seen that the present invention provides a simple power transmission system capable of maintaining a constant output speed from a variable input speed which is readily adapted to the needs of a refrigerated vehicle. It will also be understood that while the invention has been shown in one particular embodiment wherein a refrigerated compressor is driven from a vehicle engine that other forms may be adopted. Thus instead of driving the pump 24 from a vehicle engine it may be driven from the axle of a railway car or from the propeller shaft of a motor vehicle. Likewise the transmission system is adapted not only for driving a refrigerator compressor but for driving other loads which require a constant speed; as for example, driving an alternator from an internal combustion engine and for many other uses which will suggest themselves to those skilled in the art.

While the form of embodiment of the invention as herein disclosed constitutes a preferred form, it is to be understood that other forms might be adopted, all coming within the scope of the claims which follow.

What is claimed is as follows:

1. A hydraulic power transmission system comprising a reversible, variable displacement pump, a fluid motor, a closed circuit connecting the pump and the motor, a double-acting fluid motor for regulating the pump displacement, a restriction in the circuit between the pump and motor effective to produce a pressure differential varying with the flow rate therethrough, means normally connecting the regulating motor to respond to changes in pressure differential at the restriction to maintain the speed of the first fluid motor substantially constant under a wide range of speed variation of the pump, means for disestablishing the normal connection of the regulating fluid motor and establishing a connection biasing the same to a position for small reverse displacement of the pump, and a check valve in shunt with the pump and open to free flow in the reverse direction for stopping the first fluid motor.

2. A hydraulic power transmission system comprising a variable displacement pump, a fluid motor, a closed circuit connecting the pump and the motor, a double-acting fluid motor for regulating the pump displacement, a restriction in the circuit between the pump and motor effective to produce a pressure differential varying with the flow rate therethrough, means normally connecting regulating motor to respond to changes in the pressure differential at the restriction to maintain the speed of the first fluid motor substantially constant under a wide range of speed variation of the pump, means for disestablishing the normal connection of the regulating fluid motor, and biasing the same to a position of negligible displacement, and means for simultaneously by-passing the pump to effectively stop the fluid motor.

3. A hydraulic power transmission system comprising a variable displacement pump, a fluid motor, a closed circuit connecting the pump and the motor, a double-ended cylinder and piston motor for regulating the displacement of the pump, a restriction in the circuit between the pump and motor, a connection from the restriction entrance end to one end of the regulating cylinder, and a three-way valve for selectively connecting the other end of the regulating cylinder selectively either to the exit end of the restriction to thereby cause the pump to operate the motor at a substantially constant speed independent of pump speed or to an exhaust for decreasing the pump displacement substantially to zero to stop the motor.

4. A hydraulic power transmission system comprising a variable displacement pump, a fluid motor, a closed circuit connecting the pump and the motor, a double-ended cylinder and piston motor for regulating the displacement of the pump, a restriction in the circuit between the pump and motor, a connection from the restriction entrance end to one end of the regulating cylinder, a three-way valve for selectively connecting the other end of the regulating cylinder selectively either to the exit end of the restriction to thereby cause the pump to operate the motor at a substantially constant speed independent of pump speed or to an exhaust for decreasing the pump displacement substantially to zero to stop the motor, and a replenishing pump connected to the circuit on the side containing the restrictor and effective to bias the regulating motor to decreased displacement position when the three-way valve is open to exhaust said other end.

5. A hydraulic power transmission system comprising a variable displacement pump, a fluid motor, a closed circuit connecting the pump and the motor, a restrictor in said circuit between the pump and motor, a differential-area motor for regulating the displacement of the pump and responsive to increased pressure at its small area to decrease the pump displacement, a connection from the small area to the pump and motor circuit at a point ahead of the restrictor, and means for selectively connecting the large area either to the pump and motor circuit at a point beyond the restriction or to an exhaust.

6. A hydraulic power transmission system comprising a variable displacement pump, a fluid motor, a closed circuit connecting the pump and the motor, a restrictor in said circuit between the pump and motor, a differential-area motor for regulating the displacement of the pump and responsive to increased pressure at its small area to decrease the pump displacement, a connection from the small area to the pump and motor circuit at a point ahead of the restrictor, and means for selectively connecting the large area either to the pump and motor circuit at a point beyond the restriction or to an exhaust, and means for maintaining pressure in the small area while the large area is exhausted to thereby decrease the pump displacement to a negligible value.

7. A hydraulic power transmission system comprising a variable displacement pump, a fluid motor, a closed circuit connecting the pump and the motor, a double-ended cylinder and piston motor for regulating the displacement of the pump, a restriction in the circuit between the pump and motor, a connection from the restriction entrance end to one end of the regulating cylinder, a three-way valve for selectively connecting the other end of the regulating cylinder selectively either to the exit end of the restriction to thereby cause the pump to operate the motor at a substantially constant speed independent of pump speed or to an exhaust for regulating the pump to a slight reverse displacement, and a check valve in shunt with the pump and open to free flow in the reverse direction.

8. A hydraulic power transmission system comprising a variable displacement pump, a fluid motor, a closed circuit connecting the pump and the motor, a restrictor in said circuit between the pump and motor, a differential-area motor for regulating the displacement of the pump and responsive to increased pressure at its small area to decrease the pump displacement, a connection from the small area to the pump and motor circuit at a point ahead of the restrictor, means for selectively connecting the large area either to the pump and motor circuit at a point beyond the restriction, to thereby maintain the motor speed substantially constant independently of pump speed variations or to exhaust to thereby regulate the pump to a slight reverse displacement, means for maintaining pressure in the small area while the large area is exhausted, and a check valve in shunt with the pump open to free flow in the reverse direction.

9. A hydraulic power transmission system comprising a variable displacement pump, a fluid motor, a closed circuit connecting the pump and the motor, a double-acting fluid motor for regulating the pump displacement, a restriction in the circuit between the pump and motor, means normally connecting the regulating motor to respond to changes in the pressure drop through the restrictor to maintain the speed of the first fluid motor substantially constant under a wide range of speed variation of the pump, means for disestablishing the normal connection of the regulating fluid motor, and biasing the same to a position of negligible displacement, means for simultaneously by-passing the pump to effectively stop the fluid motor, and an auxiliary pump connected into the pump and motor circuit to replenish leakage therein during forward operation and to maintain a biasing pressure on the regulating motor during idle periods of the first fluid motor.

JAMES ROBINSON.

REFERENCES CITED

The following references are of record in the file of this patent:

UNITED STATES PATENTS

| Number | Name | Date |
|---|---|---|
| 1,503,664 | Richardson | Aug. 5, 1924 |
| 2,056,896 | Douglas | Oct. 6, 1936 |
| 2,077,974 | Wishart | Apr. 20, 1937 |
| 2,097,857 | Ferris et al. | Nov. 2, 1937 |
| 2,101,495 | Ferris et al. | Dec. 7, 1937 |
| 2,238,061 | Kendrick | Apr. 15, 1941 |
| 2,291,011 | Vickers | July 28, 1942 |
| 2,374,630 | Tucker | Apr. 24, 1945 |